(12) United States Patent
Kao et al.

(10) Patent No.: US 7,088,228 B2
(45) Date of Patent: Aug. 8, 2006

(54) SAFETY WARNING LIGHT DEVICE FOR VEHICLE

(76) Inventors: Chih Hsien Kao, P.O. Box 10-69, Chong Ho, Taipei (TW) 235; Chia Fang Kao, P.O. Box 10-69, Chong Ho, Taipei (TW) 255

( * ) Notice: Subject to any disclaimer, the term of this patent is extended or adjusted under 35 U.S.C. 154(b) by 194 days.

(21) Appl. No.: 10/801,747

(22) Filed: Mar. 12, 2004

(65) Prior Publication Data

US 2005/0200469 A1    Sep. 15, 2005

(51) Int. Cl.
*B60Q 1/50* (2006.01)

(52) U.S. Cl. ............... 340/467; 340/463; 340/464

(58) Field of Classification Search ........ 340/464, 340/467, 468, 479, 463
See application file for complete search history.

(56) References Cited

U.S. PATENT DOCUMENTS

| | | | | |
|---|---|---|---|---|
| 3,305,829 A | * | 2/1967 | Knez | 340/479 |
| 3,568,146 A | * | 3/1971 | Knez | 340/479 |
| 3,651,293 A | * | 3/1972 | Hoffman | 200/553 |
| 5,210,522 A | * | 5/1993 | Hoekman et al. | 340/467 |
| 5,381,135 A | * | 1/1995 | Blount | 340/487 |

* cited by examiner

*Primary Examiner*—Brent A. Swarthout

(57) ABSTRACT

A warning light device includes a light member, and a coupling device for coupling the light member to the accelerator pedal of the vehicle, to actuate the light member to generate warning light when the accelerator pedal of the vehicle is released by the drivers, in order to indicate the releasing of the accelerator pedal of the vehicle, and for allowing the following drivers to have a longer time to make responses or to take actions. A rack may be coupled to the accelerator pedal, and a gear may be rotatably engaged onto a spindle of a generator, to actuate the generator to energize the light member when the accelerator pedal is released by the drivers.

5 Claims, 4 Drawing Sheets

SAFETY WARNING LIGHT DEVICE FOR VEHICLE

BACKGROUND OF THE INVENTION

1. Field of the Invention

The present invention relates to a warning light device, and more particularly to a safety warning or braking light device for indicating releasing of accelerator rather than indicating stepping of brake pedal of vehicles.

2. Description of the Prior Art

Typically, the brake or warning light devices of vehicles are provided to generate warning lights when the brake pedals of the vehicles are stepped or actuated by the drivers.

When driving in low speed areas and after the brake pedals have been stepped or actuated by the drivers, the drivers of the other vehicles following the braking vehicles may have a time long enough to make responses.

However, when driving in high speed areas, such as highway or freeway, the time may be too short for the drivers of the other vehicles to make responses or to take actions when the brake pedals of the vehicles in front of them are stepped or actuated by the drivers.

The present invention has arisen to mitigate and/or obviate the afore-described disadvantages of the conventional warning light devices.

SUMMARY OF THE INVENTION

The primary objective of the present invention is to provide a warning light device may be provided for indicating the releasing of the accelerator of the vehicle, rather than for indicating the stepping of the brake pedal of the vehicle, to allow the following drivers to have a longer time to make responses or to take actions.

In accordance with one aspect of the invention, there is provided a warning light device for indicating releasing of accelerator pedal of vehicle, the warning light device comprising a light member, and a coupling device for coupling the light member to the accelerator pedal of the vehicle, to actuate the light member to generate warning light and to indicate releasing of the accelerator pedal of the vehicle.

The coupling device includes a control device coupled to the light member to control the light member. The coupling device may further include at least one battery coupled to the control device, and controlled by the control device to actuate the light member.

The coupling device may further include a generator for coupling to and controlling the light member. The generator includes a spindle, the coupling device includes a connecting device for connecting the spindle of the generator to the accelerator pedal.

The connecting device includes a gear rotatably engaged onto the spindle, and an actuating device for actuating the gear to rotate the spindle in an active direction, but not rotate in a reverse direction. The gear includes at least one slot formed therein and having a greater side and a reduced side, the actuating device includes an actuator received in the slot of the gear, and arranged to be engaged between the gear and the spindle when the actuator is received in the reduced side of the slot of the gear.

The actuating device includes a rack engaged with the gear and for connecting to and for being moved by the accelerator pedal. The actuating device includes a clip coupled to the rack, and for connecting to the accelerator pedal. A base may further be provided and includes a roller to support the rack. The gear includes a cap attached thereto, to retain the actuator within the slot of the gear.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
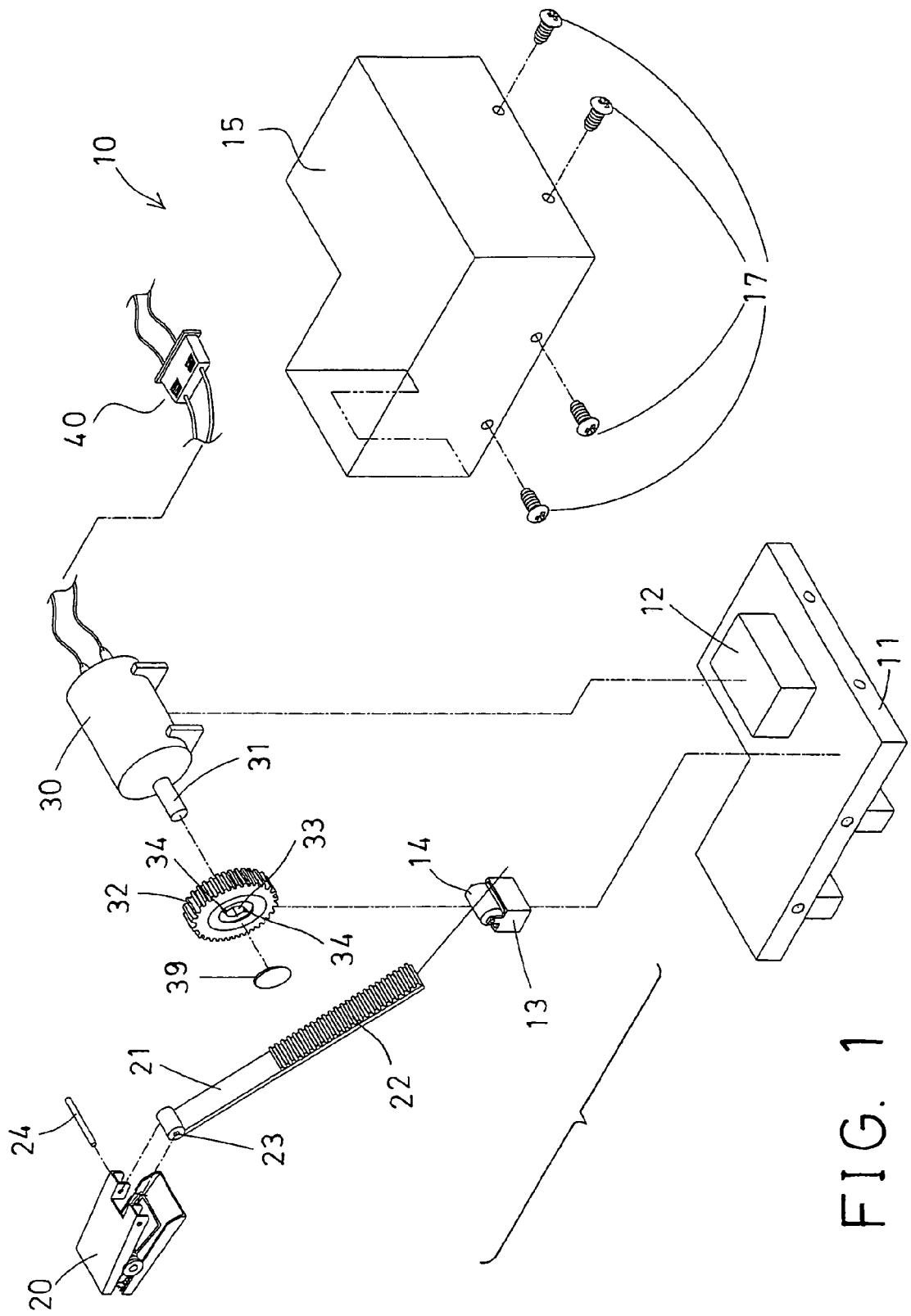
FIG. 1 is a partial exploded view of a warning light device in accordance with the present invention.
Figure 2:
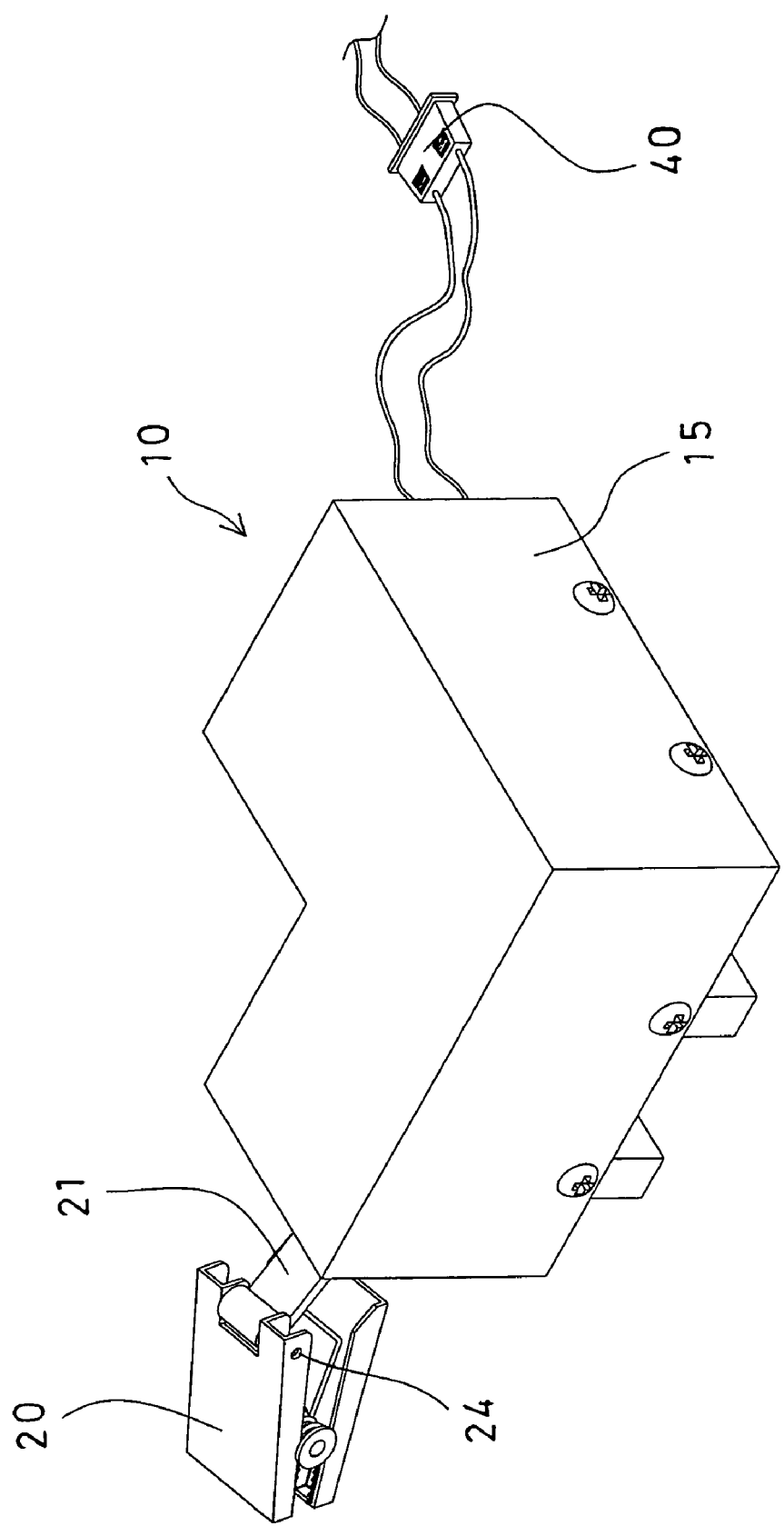
FIG. 2 is a partial perspective view of the warning light device.
Figure 3:
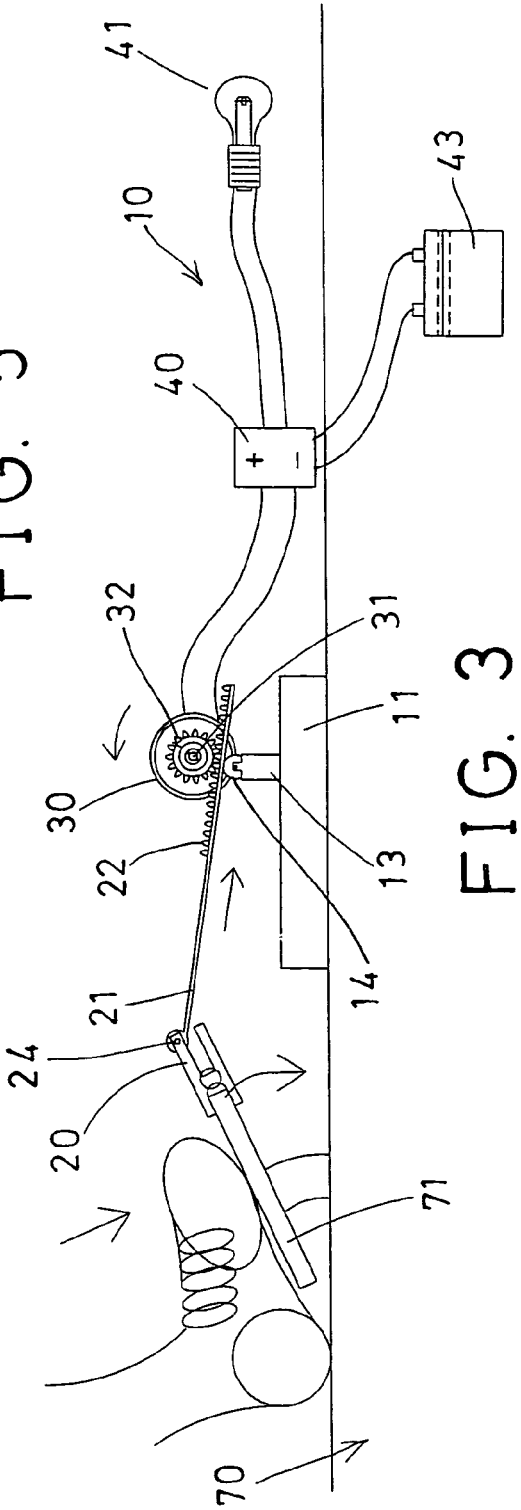
FIG. 3 is a partial plan schematic view of the warning light device.

Referring to the drawings, and initially to FIGS. 1–3, a warning light device 10 in accordance with the present invention comprises a base 11 for being attached onto the chassis 70 of vehicles (FIGS. 3, 4), and including a swelling 12 extended upwardly therefrom, and a seat 13 extended upwardly therefrom to support a roller 14 or the like. A cover 15 may be secured onto the base 11 with such as fasteners 17, to retain various elements or members within the base 11 and the cover 15.

An adapter 20, such as a clip 20 is provided for coupling to the accelerator pedal 71 (FIGS. 3, 4) of the vehicle and for being moved in concert with the accelerator pedal 71. A rack 21 includes a number of teeth 22 formed or provided thereon, and includes one end 23 pivotally coupled or attached to the adapter 20 with such as a shaft 24, for being moved by the adapter 20. The rack 21 may be slidably supported on the roller 14, and may be directly coupled to the accelerator pedal 71, instead of indirectly via the adapter 20.

Figure 4:
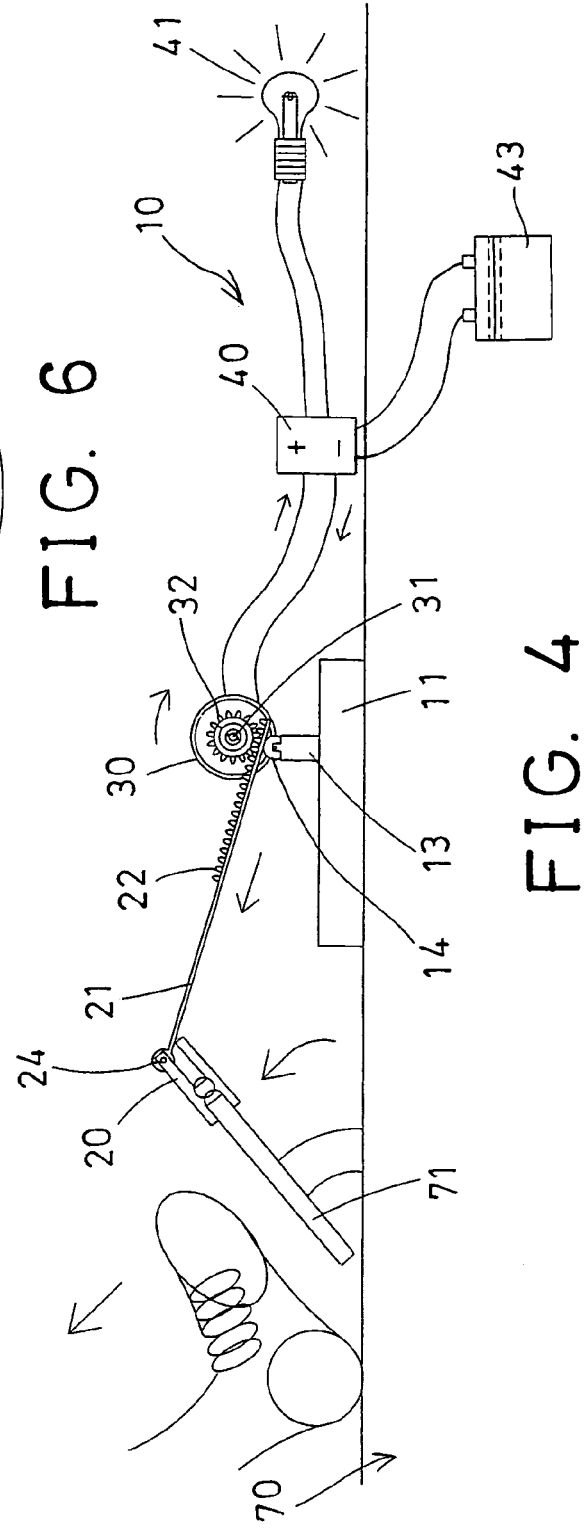
FIG. 4 is a partial plan schematic view similar to FIG. 3, illustrating the operation of the warning light device.

In operation, as shown in FIGS. 3 and 4, when the accelerator pedal 71 is stepped or actuated by the drivers (FIG. 3), the rack 21 may be actuated or moved forward relative to the base 11 and the roller 14. On the contrary, when the accelerator pedal 71 is released by the drivers (FIG. 4), the rack 21 may be actuated or moved rearward relative to the base 11 and the roller 14.

The warning light device 10 further includes a motor or a generator 30 disposed on the swelling 12 of the base 11, and having a spindle 31 extended therefrom. A gear 32 is engaged with the rack 21 and includes a bore 33 formed therein (FIGS. 1 and 5–6) to rotatably receive the spindle 31 of the generator 30, and includes one or more, such as two opposite slots 34 formed therein and communicating with the bore 33 thereof for receiving actuators 35, such as rollers or balls 35 therein respectively (FIGS. 5, 6).

Figure 5:
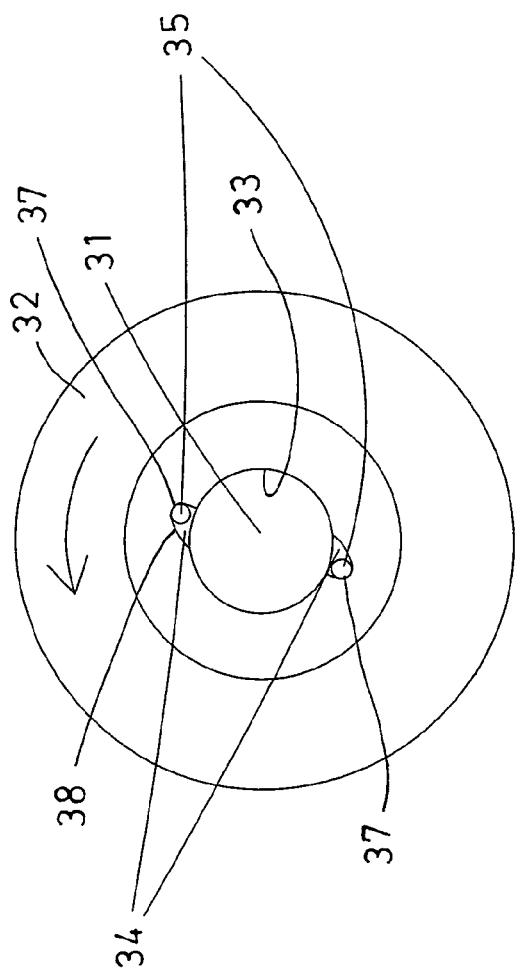
FIGS. 5, 6 are enlarged partial plan schematic views illustrating the arrangements or the operations of the warning light device as shown in FIGS. 3 and 4 respectively.
Figure 6:
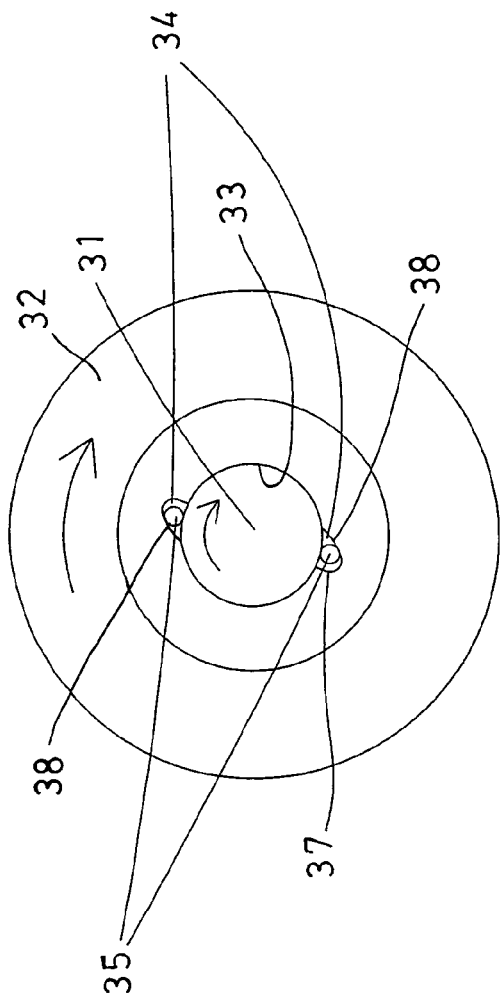

As best shown in FIGS. 5, 6, each of the slots 34 of the gear 32 includes a wider or longer or greater side 37 for loosely receiving the actuator 35, and a narrower or shorter or smaller or reduced side 38 for allowing the actuator 35 to be forced or engaged between the spindle 31 and the gear 32 when the gear 32 is rotated in one or active direction relative to the spindle 31. A cap 39 (FIG. 1) may be attached to the gear 32, to stably retain the actuators 35 within the slots 34 of the gear 32 respectively.

When the gear 32 is caused to rotate in one or active direction, such as clockwise (FIGS. 4, 6) by the accelerator pedal 71 via the rack 21, the actuators 35 are arranged to be forced to move toward the narrower or shorter or smaller sides 38 of the respective slots 34 of the gear 32, and to be engaged or clamped between the spindle 31 of the generator 30 and the gear 32, to allow the spindle 31 to be rotated or actuated by the gear 32.

As shown in FIGS. 3, 5, when the gear 32 is caused to rotate in the other or opposite or reverse direction, such as counter clockwise by the accelerator pedal 71 via the rack 21, the actuators 35 are arranged to be moved toward and loosely received in the wider or longer or greater sides 37 of the respective slots 34 of the gear 32. At this moment, the actuators 35 will not be engaged or clamped between the spindle 31 of the generator 30 and the gear 32, such that the spindle 31 of the generator 30 will not be rotated or actuated by the gear 32.

A processor or control device 40 may further be provided and coupled to the generator 30, one or more light members 41 may be coupled to the control device 40 for being controlled by the control device 40, and for being energized or actuated by the generator 30, for example, to generate warning lights. One or more batteries 43 may further be provided and coupled to the control device 40, to further energize or actuate the light members 41.

In operation, as shown in FIGS. 4, 6, when the accelerator pedal 71 is released by the drivers, the rack 21 may be actuated or moved rearward relative to the base 11 and the roller 14, to rotate the gear 32 in one or active direction, such as clockwise. At this moment, the actuators 35 are arranged to be forced to move toward the narrower or shorter or smaller sides 38 of the respective slots 34 of the gear 32, and to be engaged or clamped between the spindle 31 of the generator 30 and the gear 32, to allow the spindle 31 to be rotated or actuated by the gear 32.

When the spindle 31 of the generator 30 is rotated or actuated by the gear 32, the generator 30 may generate a signal, such as an electric signal to energize or actuate the light members 41 directly, or indirectly via the control device 40. Alternatively, the generator 30 may generate a signal to actuate the control device 40, and to control the batteries 43 to energize or actuate the light members 41, in order to generate warning lights.

On the contrary, as shown in FIGS. 3, 5, when the accelerator pedal 71 is stepped or actuated by the drivers, the rack 21 may be actuated or moved forward relative to the base 11 and the roller 14, to rotate the gear 32 in the other or opposite direction, such as counter clockwise. At this moment, the actuators 35 may be loosely received in the wider or longer or greater sides 37 of the respective slots 34 of the gear 32, and the spindle 31 of the generator 30 will not be rotated or actuated by the gear 32, such that the light members 41 will not generate warning lights at this moment.

Accordingly, when the accelerator pedal 71 is stepped or actuated by the drivers to accelerate the vehicles, no warning lights may be generated by the light members 41. On the contrary, when the accelerator pedal 71 is released by the drivers, the light members 41 may be actuated to generate warning lights, in order to warn the following vehicles, and to allow the drivers of the following vehicles to have a longer time to make responses or to take actions, such as to step the brake pedals accordingly.

The generator 30 and the control device 40 and/or the batteries 43 and/or the rack 21 and/or the gear 32 may thus be formed as a coupling means or device to couple the light member 41 to the accelerator pedal 71, to indicate the releasing of the accelerator pedal 71 of the vehicle. The rack 21 and the gear 32 may thus be formed as a connecting means or device to couple the spindle 31 of the generator 30 to the accelerator pedal 71. The actuators 35 may be formed as an actuating means or device to actuate the spindle 31 to rotate in an action direction, but not to rotate in an opposite direction.

Accordingly, the warning light device in accordance with the present invention may be provided for indicating the releasing of the accelerator of the vehicle, rather than for indicating the stepping of the brake pedal of the vehicle, to allow the following drivers to have a longer time to make responses or to take actions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A warning light device for indicating releasing of accelerator pedal of vehicle, said warning light device comprising: a light member, and means for coupling said light member to the accelerator pedal of the vehicle, to actuate said light member to generate warning light and to indicate releasing of the accelerator pedal of the vehicle;

wherein said coupling means includes a generator for coupling to and controlling said light member;

wherein said generator includes a spindle, said coupling means includes means for connecting said spindle of said generator to the accelerator pedal;

wherein said connecting means includes a gear rotatably engaged onto said spindle, and means for actuating said gear to rotate said spindle in an active direction, but not rotate in a reverse direction;

wherein said gear includes at least one slot formed therein and having a greater side and a reduced side, said actuating means includes an actuator received in said at least one slot of said gear, and arranged to be engaged between said gear and said spindle when said actuator is received in said reduced side of said at least one slot of said gear.

2. The warning light device as claimed in claim 1, wherein said actuating means includes a rack engaged with said gear and for connecting to and for being moved by the accelerator pedal.

3. The warning light device as claimed in claim 2, wherein said actuating means includes a clip coupled to said rack, and for connecting to the accelerator pedal.

4. The warning light device as claimed in claim 2 further comprising a base having a roller to support said rack.

5. The warning light device as claimed in claim 1, wherein said gear includes a cap attached thereto, to retain said actuator within said at least one slot of said gear.

* * * * *